Patented July 1, 1930

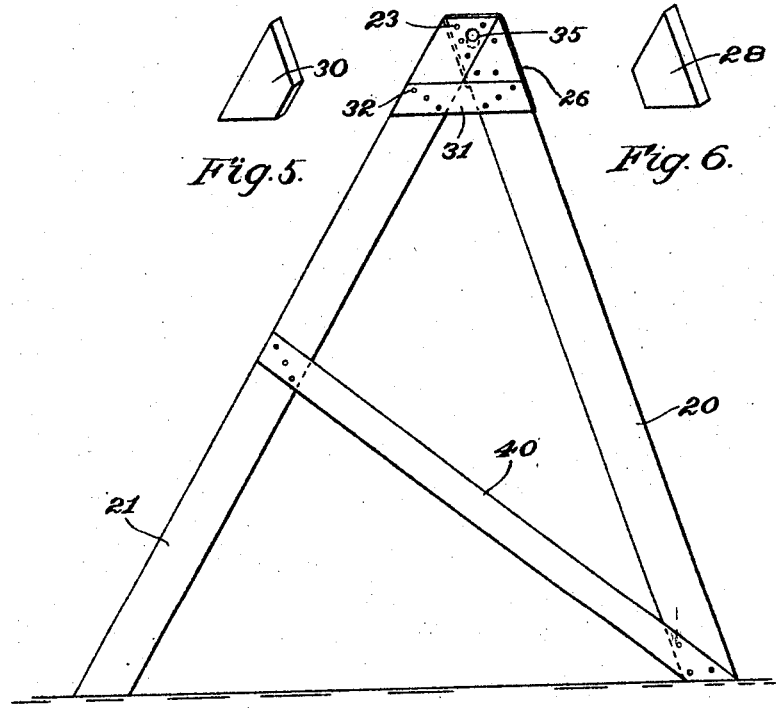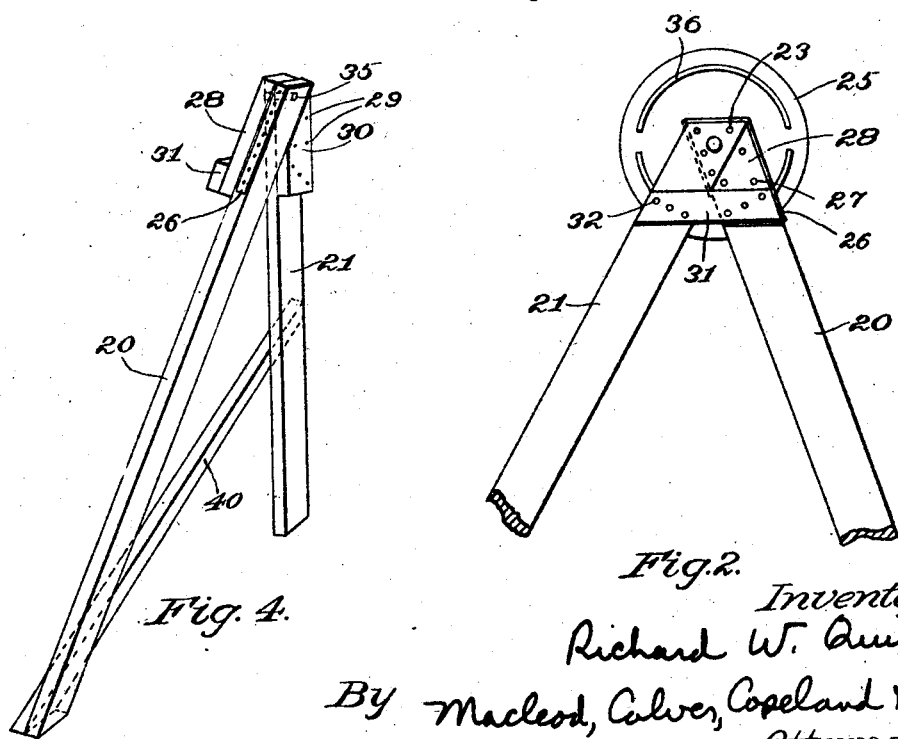

1,769,387

UNITED STATES PATENT OFFICE

RICHARD W. QUINNAN, OF DETROIT, MICHIGAN, ASSIGNOR TO HUDSON MOTOR CAR COMPANY, OF DETROIT, MICHIGAN, A CORPORATION OF MICHIGAN

LOADING DECK FOR AUTOMOBILES

Application filed April 10, 1928. Serial No. 268,820.

This invention relates to loading decks for supporting automobiles in raised position for transportation. It has been common practice to support automobiles one above the other during transportation in freight cars by relatively inclined supporting members extending upwardly from the floor of the freight car and inclined inwardly from the side walls of the car to engage and support the ends of one or more of the automobile axles. The arrangement of these supports heretofore has been such as to interfere with the brake drum surrounding the automobile axle and has tended to damage the drum. It has been difficult also for the shipper to gain access between the supporting members for securing minor parts upon the floor of the freight car.

It is an object of the present invention to overcome these difficulties and provide a loading deck including relatively inclined supporting members, the upper end portions of which are constructed and arranged and secured together in such a manner as to fit within the annular flange on the brake drum and thereby minimize the danger of injury to the drum.

It is a further object of the invention to provide a loading deck of this general type which is of simple construction and can be quickly manufactured and conveniently assembled in place to support the automobile and which is so constructed and arranged which is of simple construction and can be tween its supporting members.

The invention will be more clearly understood from the following description in conjunction with the accompanying drawings; in which, Fig. 1 is a perspective view of a portion of the interior of a freight car showing an automobile supported therein upon a loading deck embodying the invention;

Fig. 2 is a fragmentary side elevational view showing the relation of the loading deck to the automobile brake drum;

Fig. 3 is a detail elevational view of the supporting members assembled and reinforced in accordance with the invention;

Fig. 4 is a perspective view of the construction shown in Fig. 3; and

Figs. 5 and 6 are detail views of certain parts of the loading deck.

Figure 1:
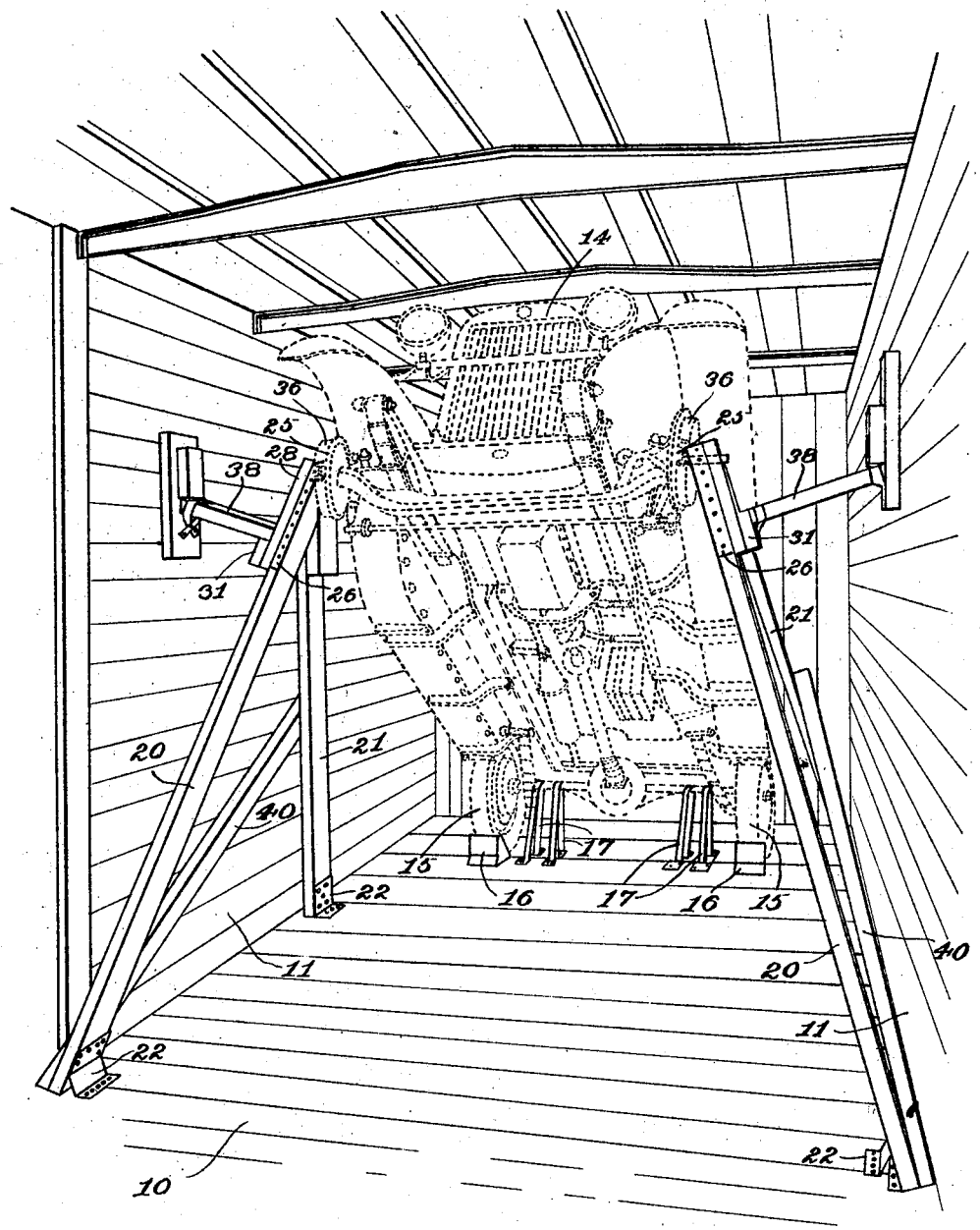

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended or the requirements of the prior art.

In the drawings a portion of the interior of a freight car is illustrated comprising a floor 10 and adjoining side walls 11. An automobile 14 is supported therein with its rear wheels 15 upon the floor 10 and the front axle supported in raised position by a loading deck embodying the invention. Blocks 16 are placed against the rear wheels of the automobile and secured to the floor 10 of the freight car. The rear wheels 15 are held in position against the blocks 16 by straps 17 extending around the rear axle of the automobile and secured to the floor 10.

A loading deck embodying the invention may comprise relatively inclined supporting members 20 and 21 resting at one end upon the floor 10 near one of the side walls 11 and suitably secured thereto, as by brackets 22. The members 20 and 21 extend upwardly from the floor and are inclined inwardly from the side walls 11 and are arranged at their upper ends, preferably in overlapped relation, and secured together, as by nails 23, thereby reducing the overall dimensions of their upper end portions to a minimum so that they may fit within the brake drums 25 upon the axle of the automobile. If desired, one or both of the supporting members may be provided with a reinforcing strap 26 at the upper end thereof.

The upper ends of the members 20 and 21 may be further reinforced by a block secured upon one member and abutting the other. As illustrated, a block 28 is secured upon the supporting member 20, as by nails 27, to engage the edge of the member 21, and a block 30 is secured, as by nails 29, upon the supporting member 21 to engage the member 20. A brace 31 may, if desired, extend between and be secured, as by nails 32, to the members 20 and 21 near their upper ends. The upper end portions of the members 20 and 21 may be provided with an opening 35, such as a hole, to receive the end of an automobile axle, the opening 35 being arranged in said members parallel to the floor 10 when said members are in normal assembled position, as shown in Fig. 1. It will be noted that by virtue of the alined openings 35 the wheel axle or spindle interlocks or inter-connects the upper ends of the beams 20 and 21. The members 20 and 21 normally fit within the annular flange 36 upon the brake drum 25. A strut 38 extends between the upper ends of the members 20 and 21 and the adjacent side wall of the freight car and is secured thereto so as to hold the loading deck and automobile against lateral movement.

Suitable means are provided for reinforcing the loading deck to prevent spreading of the members 20 and 21. In accordance with the invention a brace 40 is secured to the members 20 and 21 and is arranged to permit access conveniently between said members. With this in view the brace 40 is supported at one end upon the floor 10 of the freight car and against one of the supporting members and is extended upwardly and secured to the other member.

It will be noted that the loading deck of the invention is constructed and arranged so that the upper end portion is not materially wider than one of the supporting members and may fit within the annular flange upon the brake drum of an automobile. This arrangement makes possible the use of large and strong supporting members without danger of injury to the brake drum.

Spreading of the supporting members is prevented and any strains exerted by the automobile upon the loading deck are opposed in the direction of the strains and transmitted through the brace 40 directly to the floor of the freight car. Moreover, the inclination of the brace 40 from the floor upward permits ready access between the supports 20 and 21 inasmuch as it is secured to one of the supporting members at a point thereon which is relatively close to the side wall of the car thereby leaving the space between the members which is more remote from the side wall unobstructed.

What I claim is:

1. In a loading deck for supporting automobiles in freight cars, in combination, a pair of relatively inclined supporting members extending upwardly from the floor of the car and inclined inwardly from the side thereof and positioned in overlapping relation at their upper end portions, and means for securing said end portions together including a block on each of said members abutting the other member.

2. In a loading deck for supporting automobiles in freight cars, in combination, a pair of relatively inclined supporting members extending upwardly from the floor of the car and inclined inwardly from the side thereof and positioned in overlapping relation at their upper end portions, means for securing said end portions together, and a brace member inclined upwardly and extending between said supporting members.

3. In a loading deck for supporting automobiles in freight cars, in combination, a pair of relatively inclined supporting members extending upwardly from the floor of the car and inclined inwardly from the side thereof and positioned in overlapping relation at their upper end portions, means for securing said end portions together, and an upwardly inclined brace member supported at one end upon the floor of the car and secured at its other end to one of said supporting members.

4. In a loading deck for supporting automobiles in freight cars, in combination, a pair of relatively inclined supporting members extending upwardly from the floor of the car and inclined inwardly from the side thereof and positioned in overlapping relation at their upper end portions, means for securing said end portions together, and an upwardly inclined brace member supported at one end by the floor of the car and extending between and secured at its ends to each of said supporting members.

5. In a loading deck for supporting automobiles in freight cars, the combination with a pair of relatively inclined supporting members in engagement at their upper ends of an upwardly inclined brace member supported at one end upon the floor of the car and extending between and secured at its ends to each of said supporting members.

6. In a loading deck for supporting automobiles in freight cars, the combination of a pair of relatively inclined supporting members extending upwardly from the floor of the car and inclined inwardly from the side thereof and secured together at their upper end portions, said upper end portions being constructed and arranged to fit within a brake drum of an automobile.

7. In a loading deck for supporting automobiles in freight cars, the combination of a pair of relatively inclined supporting members extending upwardly from the floor of the car and inclined inwardly from the side thereof and secured together at their upper end portions, said upper end portions being constructed and arranged to fit within a brake drum of an automobile, and a brace member inclined upwardly and extending between said supporting members.

8. In a loading deck for supporting automobiles in freight cars, the combination of a pair of relatively inclined supporting members extending upwardly from the floor of the car and inclined inwardly from the side thereof and secured together at their upper end portions, said upper end portions being constructed and arranged to fit within a brake drum of an automobile, and an upwardly inclined brace member supported at one end upon the floor of the car and secured at its other end to one of said supporting members.

9. In a loading deck for supporting automobiles in freight cars, the combination of a pair of relatively inclined supporting members extending upwardly from the floor of the car and inclined inwardly from the side thereof and secured together at their upper end portions, said upper end portions being constructed and arranged to fit within a brake drum of an automobile, and an upwardly inclined brace member supported at one end upon the floor of the car and extending between and secured at its ends to each of said supporting members.

10. In a loading deck for supporting an automobile in a freight car, the combination of a pair of upwardly extending braces one at each side of the automobile, each brace comprising a pair of members having their upper ends superimposed one upon the other and substantially coinciding, and each provided with means to receive the wheel axle.

11. In a loading deck for supporting an automobile in a freight car, the combination of a pair of upwardly extending braces one at each side of the automobile, each brace comprising a pair of converging members having their upper ends provided with alined openings to receive the wheel axle and to be inter-locked thereby.

12. In a loading deck for supporting an automobile in a freight car, the combination of a pair of upwardly extending braces one at each side of the automobile, each brace comprising a pair of struts abutting at their upper ends whereby the upper end of the brace has substantially no greater width than one of said struts to permit it to project into the brake drum, and means for securing said abutting ends together.

13. In a loading deck for supporting an automobile in a freight car, the combination of a pair of upwardly and inwardly extending braces one at each side of the automobile, each brace comprising a pair of struts having their upper ends superimposed one upon the other and provided with common openings to receive the wheel axle.

In testimony whereof I affix my signature.
RICHARD W. QUINNAN.